United States Patent [19]

Hen

[11] Patent Number: 5,141,655

[45] Date of Patent: Aug. 25, 1992

[54] INHIBITION OF SCALE FORMATION FROM OIL WELL BRINES UTILIZING A SLOW RELEASE

[75] Inventor: John Hen, Skillman, N.J.

[73] Assignee: Mobil Oil Corporation, Fairfax, Va.

[21] Appl. No.: 837,544

[22] Filed: Feb. 14, 1992

Related U.S. Application Data

[63] Continuation of Ser. No. 531,280, May 31, 1990, abandoned.

[51] Int. Cl.$^5$ ............... E21B 43/25; C23F 11/14; C23F 11/12; C23F 11/167

[52] U.S. Cl. ............... 252/8.552; 252/8.555; 252/389.2; 252/180; 166/279; 166/300; 422/15; 422/17

[58] Field of Search ............... 252/80, 146, 147, 148, 252/180, 8.552, 8.555, 389.2, 389.22, 389.52, 389.53, 389.62; 422/15, 17; 166/279, 300

[56] References Cited

U.S. PATENT DOCUMENTS

| | | | |
|---|---|---|---|
| 3,303,139 | 2/1967 | Blaser et al. | 252/389.22 X |
| 3,619,427 | 11/1971 | Kautsky | 252/8.555 X |
| 3,654,993 | 4/1972 | Smith et al. | 252/8.555 X |
| 3,661,785 | 5/1972 | Pierri | 252/8.555 |
| 3,704,750 | 12/1972 | Miles et al. | 166/279 |
| 3,827,977 | 8/1974 | Miles et al. | 252/8.552 |
| 3,965,027 | 6/1976 | Boffard et al. | 252/390 |
| 4,033,896 | 7/1977 | Mitchell et al. | 252/8.555 |
| 4,048,065 | 9/1977 | Suen et al. | 252/8.555 X |
| 4,052,160 | 10/1977 | Cook et al. | 252/8.555 X |
| 4,153,649 | 5/1979 | Griffin, Jr. | 252/8.554 |
| 4,222,779 | 9/1980 | Benaali et al. | 252/392 X |
| 4,357,248 | 11/1982 | Berkshire et al. | 252/8.552 |
| 4,563,284 | 1/1986 | Amjad | 252/8.552 X |
| 4,602,683 | 7/1986 | Meyers | 166/279 |
| 4,663,053 | 5/1987 | Geiger | 252/389.21 |
| 4,830,782 | 5/1989 | Broze et al. | 252/545 |
| 4,872,996 | 10/1989 | Grierson et al. | 252/389.22 |
| 5,002,126 | 3/1991 | Carlberg et al. | 166/279 |

*Primary Examiner*—Robert L. Stoll
*Assistant Examiner*—C. Sayala
*Attorney, Agent, or Firm*—Alexander J. McKillop; Charles J. Speciale; Malcolm D. Keen

[57] ABSTRACT

A method for the inhibition of scale deposition on the surfaces of a well coproducing oil and scale forming brines comprising injecting into the well reservoir an acidic aqueous solution at a first pH containing dissolved therein a scale inhibitor, multivalent metal ions, and a heat sensitive pH increasing substance which decomposes at elevated temperatures liberating an alkaline compound such that the solution is inherently heated by the higher ambient reservoir temperature to a temperature at which the alkaline compound is liberated from the heat sensitive substance thus raising the pH of the solution to a point at which a sparingly soluble multivalent metal salt of the scale inhibitor is phase separated from the solution on the porous surfaces of the reservoir rock formation, providing for a slow release of inhibitor into the produced brines when the well is in its production phase.

20 Claims, No Drawings

INHIBITION OF SCALE FORMATION FROM OIL WELL BRINES UTILIZING A SLOW RELEASE

This is a continuation of copending application Ser. No. 07/531,280, filed on May 31, 1990, now abandoned.

BACKGROUND OF THE INVENTION

1. Field of the Invention

This invention relates to the inhibition of scale formation from oil well brines utilizing a slow release inhibitor composition.

2. Background Information and Description of Related Art

In the production of crude oil from underground wells, mineral scales such as barium sulfate, strontium sulfate, calcium sulfate and calcium carbonate are often formed on wellbore and equipment surfaces where oil and water containing dissolved salts are coproduced. The formation of scale can slow oil production rate and, at the extreme, stop production completely. An expedient often utilized is to inject or "squeeze" a solution of a scale inhibitor such as a polyphosphonate or a polyacrylic acid into the reservoir rock and allow the absorbed inhibitor to desorb during fluids production. In practice, however, the desorption process is often found to be quite rapid once production is resumed necessitating frequent shutdowns for additional treatments. This has the effect of substantially reducing the productivity of the well.

Various improvements in the absorption and desorption of scale inhibitors have been proposed, some of which are disclosed in the following prior art references which are cited and described herein in accordance with the terms of 37 CFR 1.56, 1.96 and 1.98.

U.S. Pat. No. 3,827,977, issued Aug. 6, 1974 to Miles et al. discloses the in situ deposition in the porous rock formation adjacent to a well bore of a polyvalent metal salt of a polyacrylic acid or partially hydrolyzed polyacrylamide inhibitor by introducing into the porous formation a strongly acidic aqueous solution of a salt of the inhibitor and the polyvalent metal. The acid is partially neutralized by the reservoir liquid causing the polyvalent salt of the inhibitor to phase separate on the porous surfaces.

U.S. Pat. No. 4,357,248 issued Nov. 2, 1982 to Berkshire et al., teaches the inhibition of scale formation in a producing well by injecting a self-reacting alkaline aqueous solution of a pH-lowering reactant, a scale inhibitor and a compound containing multivalent cations, which solution subsequently precipitates a slightly soluble scale inhibitor within the reservoir.

U.S. Pat. No. 4,602,683, issued Jul. 29, 1986 to Meyers, discloses the inhibition of scale deposition during the operation of an oil well by injecting an inhibitor solution into a subsurface brine producing formation at a higher first pH, and thereafter subjecting the solution to a fluid or substance which reduces the higher first pH to a lower second pH causing precipitation of the scale inhibitor in the formation.

SUMMARY OF THE INVENTION

In accordance with the invention, a method is provided for the inhibition of scale deposition on the surfaces of a well coproducing oil and scale forming brines comprising injecting into the well reservoir an acidic aqueous solution at a first pH containing dissolved therein a scale inhibitor, multivalent metal ions, and a heat sensitive pH increasing substance which decomposes at elevated temperatures liberating an alkaline compound, e.g. ammonia or an amine. The solution is then inherently heated by the higher ambient reservoir temperature to a temperature at which the alkaline compound is liberated from the heat sensitive substance raising the pH of the solution to a point at which a sparingly soluble multivalent metal salt of the scale inhibitor is phase separated from the solution on the surfaces of the reservoir rock formation, providing for a slow release or desorption of inhibitor into the produced brines when the well is in its production phase.

Unlike the case with some of the prior art methods described previously, the method of this invention provides for the efficient placement of a sparingly soluble scale inhibitor in the well reservoir capable of slowly releasing inhibitor into the produced brines, without the requirement for efficient mixing with such brines, which is difficult to satisfy in some sandstone formations, or the necessity for using more than one solution for the injection of the inhibitor. The method greatly enhances the retention of scale inhibitor while keeping to a minimum damage of the reservoir rock which could be caused by excessive precipitation of multivalent metal salt of inhibitor on the porous reservoir surfaces.

DESCRIPTION OF PREFERRED EMBODIMENTS

The scale inhibitors contemplated under this invention contain a multiplicity of reactive groups, for example, carboxylate and/or phosphonate, which are capable of interacting with the polyvalent metal ions in the produced brines to prevent or minimize the deposition of scale on reservoir, wellbore, and equipment surfaces. The inhibitor, may be, for example, a polycarboxylate, e.g., a polymeric polycarboxylate such as a homopolymer or copolymer (composed of two or more comonomers) of an alpha, beta-ethylenically unsaturated acid monomer such as acrylic acid, methacrylic acid, a diacid such as maleic acid (or maleic anhydride), itaconic acid, fumaric acid, mesoconic acid, citraconic acid and the like, monoesters of diacids with alkanols, e.g., having 1-8 carbon atoms, and mixtures thereof. When the inhibitor is a copolymer, the other component monomer may be any alpha, beta-ethylenically unsaturated monomer with either a non-polar group such as styrene or olefinic monomers, or a polar functional group such as vinyl acetate, vinyl chloride, vinyl alcohol, alkyl acrylates, vinyl pyridine, vinyl pyrrolidone, acrylamide or acrylamide derivatives, etc., or with an ionic functional group such as styrenesulfonic acid, 2-acrylamido-2-methylpropanesulfonic acid (AMPS), vinylsulfonic acid, or vinylphosphonic acid. Certain of the foregoing copolymers may be prepared by aftertreating a homopolymer or a different copolymer, e.g., copolymers of acrylic acid and acrylamide by partially hydrolyzing a polyacrylamide. The contemplated polymeric polycarboxylate inhibitors also include the foregoing homopolymers and copolymers chemically modified to include other functional groups contributing to their performance, e.g., the phosphinopolyacrylic acids disclosed in U.S. Pat. No. 4,105,551 and sold under the trademark "Belsperse 161" or "Belasol S-29" by Ciba Geigy. The molecular weight range of the polymeric polycarboxylate inhibitor utilized in this invention may be, for example, from about 500 to 10,000.

Also suitable as the scale inhibitor of this invention are the monomeric and polymeric phosphonates, e.g., aminomethylenephosphonates such as aminotri(methylenephosphonic acid), ethylenediaminetetra(methylenephosphonic acid), hexamethylenediaminetetra(methylenephosphonic acid), and diethylenetriaminepenta(methylenephosphonic acid), 1-hydroxyethylidene-1,1-diphosphonic acid, and homopolymers and copolymers of vinylphosphonate.

Another class of inhibitors which may be used in practicing the method of this invention are organic phosphate esters such as phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine. Some examples of this class of inhibitors are disclosed in Jack C. Cowan and Donald J. Weintritt, *Water-Formed Scale Deposits*, (Houston: Gulf Publishing Co., 1976), 284 and 285.

The inhibitor may be present in the injected solution in an amount, for example, in the range of about 0.25 to 15 wt. % preferably about 0.5 to 5 wt. %, based on the total weight of the solution.

The multivalent metal ions are those capable of forming sparingly soluble salts of the scale inhibitor at a pH higher than that of the initial injected solution. Some multivalent metal ions which can be used are, for examples, alkaline earth metal ions, particularly calcium and magnesium, aluminum (+3), chromium (+3), iron (+3), titanium (+3), zirconium (+4), zinc (+2), and copper (+2). The preferred multivalent metal ions are calcium and magnesium. The ions are utilized in the form of a water-soluble salt, preferably containing an anion which does not contribute to scale formation, e.g., chloride or nitrate. The amount of dissolved multivalent metal ions employed in the solution is in the range, for example, of about 0.05 to 5.0, preferably about 0.20 to 2.50 equivalents per equivalent of inhibitor.

The heat sensitive, pH-increasing compound may be, for example, urea or a urea derivative, having the formula:

$$R^1R^2NCONR^3R^4$$

where the R's are the same or different and each may be, for example, hydrogen, an alkyl group containing 1 to 8 carbon atoms or an aromatic group, e.g., phenyl or tolyl. Compounds which may be employed are, for example, urea, 1-methylurea, 1,1-dimethylurea, 1,3-dimethylurea, 1,1,3-trimethylurea, 1-ethylurea, 1,1-diethylurea, 1,3-diethylurea, 1-phenylurea, 1-methyl-3-phenylurea and 1-ethyl-1-phenylurea.

When urea or any of the contemplated urea derivatives are heated to an elevated temperature, e.g., at least about 40° C. such as occurs in the reservoirs of producing wells, they liberate ammonia and/or amine in accordance with the following equation.

$$R^1R^2NCONR^3R^4 + H_2O \xrightarrow{\Delta} NHR^1R^2 + NHR^3R^4 + CO_2$$

The liberated ammonia or amine is a basic substance which acts to increase the pH of the injected solution to a level at which a sparingly soluble multivalent metal salt of the inhibitor phase separates and slowly releases inhibitor into the reservoir during production thus minimizing scale deposition. The $CO_2$ liberated may or may not dissolve in the brine depending on the reservoir conditions. In any case there is a two to one molar ratio of amine to $CO_2$ liberated.

Another group of heat sensitive pH increasing compounds which may be used are organic azides containing the group $-N=N=N$. For example acyl azides having the formula $RCON=N=N$, on being heated to above about 80° C., tend to rearrange to the isocyanate $R-N=C=O$ with the liberation of nitrogen ($N_2$); the isocyanate then reacts with water to yield the amine and $CO_2$, in accordance with the following equation:

$$R-N=C=O + H_2O \xrightarrow{\Delta} RNH_2 + CO_2$$

Since one mole of $CO_2$ is released with each mole of amine, acyl azides are useful in the special case where the produced water is fully saturated with native $CO_2$ under reservoir conditions, and the $CO_2$ liberated from the reaction goes into the oil phase. Under these conditions, the amine has the effect of increasing the pH of the inhibitor solution providing for the phase separation and subsequent slow release of the multivalent metal salt of the inhibitor, as described previously in connection with the use of urea or a urea derivative as the heat sensitive substance.

Azides which may be used are, for example, acetyl azide, propionyl azide, malonyl azide, succinyl azide, phthaloyl azide and other acyl diazides.

Other heat sensitive base releasing materials which may be used are, for example, cyanic acid, and amines which have been previously sorbed into activated carbon or a similar sorption matrix.

The heat sensitive pH increasing substance is present in an amount sufficient to raise the pH in the reservoir sufficiently to effect the phase separation on the porous surfaces of the reservoir of all or a significant portion of the inhibitor as its sparingly soluble multivalent metal salt, such that an adequate amount of inhibitor is fed into the well formation during the production phase of the well to significantly inhibit scale deposition. In many cases, the heat sensitive pH-increasing substance will be utilized in the original inhibitor solution to be injected in an amount of about 0.01 to 5.0 wt. %, preferably about 0.2 to 2.0 wt. % based on the weight of the solution, and sufficient sparingly soluble multivalent salt of inhibitor is deposited on the surfaces of the well formation to maintain the concentration of inhibitor in the produced brine in the range of about 0.05 to 50 ppm, preferably about 0.5 to 10 ppm.

As stated, in order to prevent phase separation or precipitation of the multivalent salt of the inhibitor in the solution to be injected, such solution must have an initial pH in the acidic range, e.g., about 1.0 to 6.0, preferably 2.5 to 4.5. Such acidity may be obtained at least partially by the use of an acidic inhibitor. However, if the inhibitor is not sufficient for the purpose, additional acidity of the initial solution may be obtained by the addition of a strong acid, e.g., hydrochloride or nitric acid, or a combination of strong and weak acids. Sulfuric acid is generally not used for this purpose since sulfate ions can contribute significantly to scale deposition.

Substantially any source of water may be used as the aqueous solvent in the preparation of the initial inhibitor solution to be injected, e.g., sea water or inland surface or underground waters. However, the nature of the initial aqueous solvent utilized could effect the quantity and possibly the nature of the added inhibitor solution components to obtain the optimum properties of the solution in carrying out the inventive process.

The inhibitor solution is injected or squeezed into the reservoir formation using techniques well-known in the art. In general, the benefits of the process will be obtained if the temperature within the reservoir formation is, for example, in the range of about 40 to 200, preferably about 50° to 150° C.

The invention is further illustrated by the following examples. In Examples 1 to 3, the scale inhibitor was a phosphino-polyacrylic acid (PPA), produced as shown in U.S. Pat. No. 4,105,551 and sold by Ciba Geigy under the trademark "Belsperse 161", and having an average molecular weight of 3000-4000, a specific gravity of 1.26, a pH neat of less than 3.5, a pH of 1% aqueous solution of 2 to 3, and a phosphorous content (as P) of 0.86%; the multivalent metal ions were calcium added as calcium chloride; and the heat sensitive pH increasing substance was urea. In all the examples the sea water utilized as the aqueous solvent medium had the following composition:

TABLE 1

| Components | Concentration, grams/liter |
|---|---|
| $MgCl_2 \cdot 6H_2O$ | 11.70 |
| $CaCl_2 \cdot 2H_2O$ | 1.47 |
| KCl | 0.70 |
| $Na_2SO_4$ | 3.92 |
| NaCl | 25.10 |
| de-ionized $H_2O$ to 1 liter | |

EXAMPLE 1

This example illustrates the effect of pH in causing phase separation at 100° C. of a solution of PPA and calcium ions.

A solution was prepared of 3.52 wt. % PPA and 0.33 wt. % of calcium ions in sea water. The pH of five samples of this solution was adjusted to five different levels and each sample was held at 22 hours at 100° C. during which time the samples were monitored for hazing and phase separation. The results are shown in Table 2. No change from the initial pH of any of the samples occurred as a result of the heat treatment.

TABLE 2

| Sample | 1A | 1B | 1C | 1D | 1E |
|---|---|---|---|---|---|
| pH | 3.08 | 3.50 | 3.75 | 4.00 | 4.50 |
| minutes to initial haze | none | none | none | 1.0 | 1.0 |
| separated layer after 22 hours | none | none | none | very small | small |

As indicated in Table 2, no phase separation occurred at pH's up to 3.75 over a period of 22 hours. However, almost immediate hazing (after one minute) and eventual phase separation of a clear and small bottom layer was observed at pH's of 4.00 and 4.50 with that at 4.50 being slightly larger than at 4.00. Thus, the results indicate that the onset of phase separation (initial hazing) is a sharp function of pH at 100° C.

EXAMPLE 2

This example illustrates the effect of a heat sensitive pH-increasing substance such as urea in obtaining the advantages of this invention.

Urea in an amount of 0.80 wt. % based on the weight of the solution was added to the solution of Example 1, and four samples of the modified solution were adjusted to different pH values from 3.67 to 2.75. These samples plus, for comparison purposes, a sample to which no urea was added and adjusted to a pH of 5.00, were held at 100° C. for 24 hours. The effect of the urea in terms of pH increase and phase separation of the inhibitor, indicated by time to initial haze and percent of inhibitor phase separated, is shown in Table 3 wherein the values of initial pH were measured at 25° C. before any heat treatment, and those of final pH were measured at 25° C. after the heat treatment.

TABLE 3

| Sample | 2A | 2B | 2C | 2D | 2E |
|---|---|---|---|---|---|
| % urea | 0 | 0.8 | 0.8 | 0.8 | 0.8 |
| initial pH | 5.00 | 3.67 | 3.55 | 3.28 | 2.75 |
| final pH | 5.00 | 5.42 | 5.10 | 4.80 | 4.55 |
| time to initial haze | 1 min. | 1.2 hr | 1.8 hr | 3.8 hr | 5.2 hr |
| % inhibitor phase separated | 26 | 41 | 38 | 35 | 36 |

Table 3 shows that in contrast with sample 2A containing no urea in which phase separation occurred almost immediately at a pH of 5.00, samples 2B to 2E exhibited times to initial haze of 1.2 to 5.2 hours at initial pH's of between 3.67 and 2.75, indicating much better control of onset time for phase separation. Moreover, this control was accompanied by a rise in the pH to values between 5.42 and 4.55 caused by the decomposition of urea which in turn brought about the phase separation of substantial proportions of the inhibitor from the initial solution, viz., from 35 to 41%, for subsequent slow release into the reservoir during the production phase.

EXAMPLE 3

This example illustrates the effect of the inventive process on the deposition of inhibitor in the porous structure of berea sandstone cores, which simulates the structures of certain reservoir rock formations, and the subsequent slow release or desorption of the inhibitor from such cores.

Coreflood studies were conducted on three of the inhibitor solutions shown in Example 2, viz., samples 2A, 2B and 2D, and an additional control solution containing 3.52 wt. % of PPA in sea water with no added calcium or urea. Berea sandstone cores with permeability to nitrogen of 200 millidarcies and dimensions of 1" diameter by 3" length, were presaturated with a brine 1 (simulating a well produced brine) at 95° C. in a Hassler flow cell. A 0.4 pore volume slug of inhibitor solution in sea water in injected at 20 ml per hour, followed by 3.0 ml afterflush with sea water. The core was shut-in overnight to allow equilibrium retention of the inhibitor prior to flowing back with brine 1 until no return of inhibitor was measured or until significant plugging occurred.

The composition of brine 1 is shown in Table 4.

TABLE 4

| Components | Concentration, grams/liter |
|---|---|
| $MgCl_2 \cdot 6H_2O$ | 0.77 |
| $CaCl_2 \cdot 2H_2O$ | 2.00 |
| KCl | 0.66 |
| $BaCl_2 \cdot 2H_2O$ | 0.24 |
| $SrCl_2 \cdot 6H_2O$ | 0.53 |
| NaCl | 49.19 |
| de-ionized $H_2O$ to 1 liter | |

The coreflood with solution sample 2A containing 0.33 wt. % of added calcium ions and no added urea, and having an initial pH of 5.0, plugged after overnight shut-in. Several attempts to flow back with brine 1 failed and the coreflood was terminated. Plugging probably occurred early in the shut-in period as indicated by the fact that the solution required only one minute at 100° C. to produce haze (see Example 2), due to the insolubility of the calcium salt of PPA at the relatively high pH of 5.0.

Trials with the remaining samples did not result in plugging during the overnight shut-in period. Results of all the trials are shown in Table 5, where "PV at Zero Inhibitor" indicates the number of pore volumes of brine 1 passing through the core until no release of inhibitor was measured.

TABLE 5

| Sample | % Calcium | Initial % Urea | pH | PV at Zero Inhibitor |
|---|---|---|---|---|
| 2A | 0.33 | 0.0 | 5.0 | core plugged |
| inhibitor only | 0.00 | 0.0 | 4.1 | 50 |
| 2B | 0.33 | 0.8 | 3.67 | 426 |
| 2D | 0.33 | 0.8 | 3.28 | 905 |

The results show that inhibitor solutions containing both multivalent ions such as calcium and a heat sensitive pH increasing substance such as urea makes possible a much higher retention of inhibitor in a porous structure and a subsequent release of inhibitor during the passage of a much larger volume of produced brines, than the use of an inhibitor solution not containing these additives. Moreover, the solutions containing both additives do not cause the rapid plugging which results from the use of an equivalent solution containing the multivalent ions but no heat sensitive pH-increasing substance.

EXAMPLE 4

This example illustrates the effect of a heat sensitive pH-inceasing substance such as urea in the delayed phase separation of a sparingly soluble calcium salt of a phosphonate scale inhibitor at 100° C.

A solution was prepared of 3.52 wt. % of diethylenetriaminepenta(methylenephosphonic acid) (DETPMP available from Monsanto as a 50 wt. % solution under the trademark "Dequest 2060") and 0.41 wt. % of calcium ions added as calcium chloride dojudrate in sea water. The pH of three samples of this solution was adjusted to three different levels and each sample was held for 22 hours at 100° C. during which time the samples were monitored for hazing and phase separation. The results for these samples indicated as 4A, 4B and 4C, are shown in Table 6. No change from the initial pH of any of the samples occurred as a result of the heat treatment.

TABLE 6

| Sample | 4A | 4B | 4C | 4D | 4E |
|---|---|---|---|---|---|
| % urea | 0 | 0 | 0 | 1.2 | 0.5 |
| initial pH | 3.18 | 2.16 | 2.57 | 2.79 | 2.59 |
| final pH | 3.18 | 2.16 | 2.57 | 4.54 | 3.06 |
| minutes to initial haze | 0 | none | none | 5 | 15 |
| phase separation after 22 hours | moderate | none | none | moderate | moderate |

As indicated in Table 6, no phase separation occurred at pH's 2.16 to 2.57 over a period of 24 hours. However, immediate hazing and phase separation of a moderate amount of an opaque bottom layer was observed at a pH of 3.18.

Urea in the amounts of 1.2 and 0.5 wt. % based on the weight of the solution was added to two solutions with initial pH's of 2.79 and 2.59 respectively. Following the same protocol as before, the results for these samples indicated as 4D and 4E are also shown in Table 6. The results show that the initial hazing can be delayed to 5 minutes and 15 minutes respectively. By further reducing initial pH and urea concentration, it is expected that phase separation can be delayed even more.

EXAMPLE 5

This example illustrates that urea can be utilized to provide a time-delayed phase separation of a sparingly soluble magnesium salt of phosphino-polyacrylic acid (PPA) at 100° C.

A solution was prepared of 3.52 wt. % PPA and 1.0 wt. % of magnesium ions added as magnesium chloride hexahydrate in sea water at a pH of 3.06. The solution was held at 18 hours at 100° C. and observed for hazing and phase separation. No phase separation and no change from the initial pH occurred as a result of the heat treatment.

Urea in an amount of 0.83 wt. % based on the weight of the solution was added to a fresh sample of the above solution. When held in a 100° C. bath, phase separation occurred sometime between 3.25 hours to 18.25 hours. Analysis of the separated clear phase indicates that it contained 24% of the PPA originally charged.

I claim:

1. A method for the inhibition of scale deposition on the surfaces of a well coproducing oil and scale forming brines comprising injecting into the well reservoir an acidic (aqueous) solution at a first PH containing dissolved therein a scale inhibitor, multivalent metal ions in the presence of which said scale inhibitor is soluble at said first pH but with which it forms sparingly soluble salts at a higher pH, and a heat sensitive pH increasing substance which decomposes at elevated temperatures liberating an alkaline compound such that the solution is inherently heated by the higher ambient reservoir temperature to a temperature at which the alkaline compound is liberated from the heat sensitive substance thus raising the pH of the solution to said higher pH at which a sparingly soluble multivalent metal salt of the scale inhibitor is phase separated from the solution on the porous surfaces of the reservoir rock formation, providing for a slow release of inhibitor into the produced brines when the well is in its production phase, said heat sensitive pH increasing substance being 1) urea or a urea derivative which has the formula

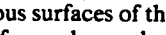
$$R^1R^2NCONR^3R^4$$

where the R's are the same or different and each is hydrogen or an alkyl group containing 1 or 2 carbon atoms, or is 1-phenylurea, 1-methyl-3-phenylurea or 1-ethyl-1phenylurea; 2) an acyl azide which on being heated to above about 80° C. rearranges to the corresponding isocyanate with the liberation of nitrogen; or 3) cyanic acid.

2. The method of claim 1 wherein said inhibitor is a polymeric polycarboxylate.

3. The method of claim 2 wherein said polycarboxylate is a polyacrylic acid.

4. The method of claim 3 wherein said polyacrylic acid is a phosphino-polyacrylic acid.

5. The method of claim 1 wherein said inhibitor is a phosphonate.

6. The method of claim 5 wherein said phosphonate is an aminomethylenephosphonate.

7. The method of claim 5 wherein said phosphonate is a polymeric phosphonate.

8. The method of claim 1 wherein said multivalent metal ions are alkaline earth, aluminum (+3), chromium (+3), iron (+3), titanium (+3), zirconium (+4), zinc (+2) or copper (+2).

9. The method of claim 8 wherein said multivalent metal ions are calcium.

10. The method of claim 8 wherein said multivalent metal ions are magnesium.

11. The method of claim 1 wherein said heat sensitive substance is urea or said urea derivative.

12. The method of claim 1 wherein said inhibitor is present in an amount of about 0.25 to 15 wt. % based on the weight of the solution, said metal ions are present in an amount of about 0.05 to 5.0 equivalents per equivalent of inhibitor, and said heat sensitive substance is present in an amount of about 0.01 to 5.0 wt. % based on the weight of the solution.

13. The method of claim 1 wherein said inhibitor is a phosphate ether of a polyol or its salt containing one or more 2-hydroxyethyl groups.

14. The method of claim 1 wherein said inhibitor is a phosphate ester obtained by reacting polyphosphoric acid or phosphorus pentoxide with diethanolamine or triethanolamine.

15. The method of claim 11 wherein said heat sensitive substance is urea, 1-methylurea, 1,1-dimethylurea, 1,3-dimethylurea, 1,1,3-trimethylurea, 1-ethylurea, 1,1-diethylurea, 1,3-diethylurea, 1-phenylurea, 1-methyl-3phenylurea or 1-ethyl-1-phenylurea.

16. The method of claim 15 wherein said heat sensitive substance is urea.

17. The method of claim 15 wherein said heat sensitive substance is 1,1-dimethylurea.

18. The method of claim 1 wherein said heat sensitive substance is said acyl azide.

19. The method of claim 18 wherein said acyl azide is acetyl azide, propionyl azide, malonyl azide, succinyl azide, or phthaloyl azide.

20. The method of claim 1 wherein said heat sensitive substance is cyanic acid.

* * * * *